(Model.)

N. W. WILLIAMS & E. B. SEELY.
HOSE COUPLING.

No. 525,522. Patented Sept. 4, 1894.

Witnesses,

Inventors,
Nathan W. Williams
Edward B. Seely.
By Dewey & Co, atty

UNITED STATES PATENT OFFICE.

NATHAN WALLACE WILLIAMS, OF SANTA BARBARA, AND EDWARD BLAKE SEELY, OF SAN FRANCISCO, CALIFORNIA.

HOSE-COUPLING.

SPECIFICATION forming part of Letters Patent No. 525,522, dated September 4, 1894.

Application filed May 31, 1893. Serial No. 476,163. (Model.)

*To all whom it may concern:*

Be it known that we, NATHAN WALLACE WILLIAMS, residing at Santa Barbara, Santa Barbara county, and EDWARD BLAKE SEELY, residing in the city and county of San Francisco, State of California, citizens of the United States, have invented an Improvement in Hose-Couplings; and we hereby declare the following to be a full, clear, and exact description of the same.

Our invention relates to a hose coupling.

It consists in certain details of construction which will be more fully explained by reference to the accompanying drawings, in which—

Figure 1:
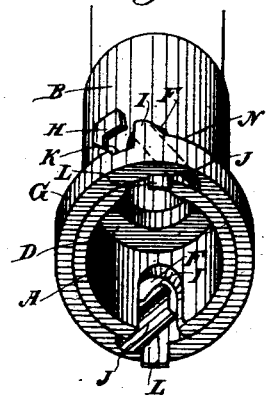
Figure 2:
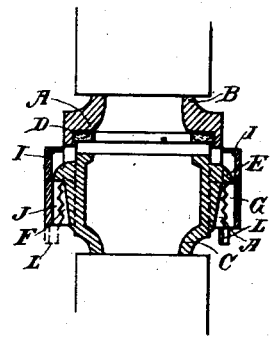
Figure 3:
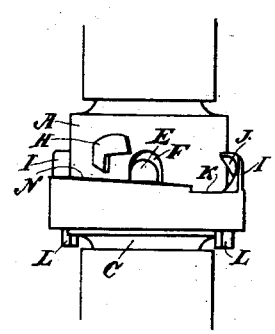
Figure 4:
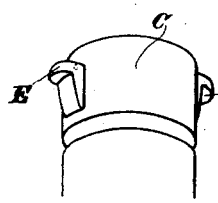
Figure 5:
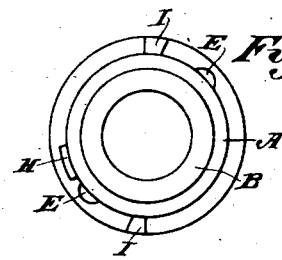
Figure 6:
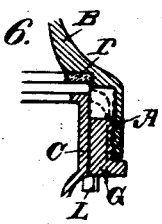
Figure 7:
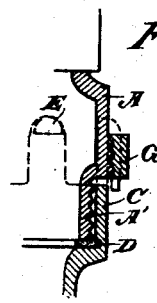

Figure 1 is a view of the female member of the coupling with its attachments. Fig. 2 is a sectional view of the coupling, the lugs on the male coupling having just entered through the channels and are ready to be locked. Fig. 3 is an exterior view of the coupling in its locked state. Fig. 4 is a view of the male member of the coupling. Fig. 5 is a plan view of the female member. Fig. 6 shows a modification in which the collar is inside of the socket in the female coupling. Fig. 7 shows the female member with an extension.

The object of our invention is to provide a coupling by which the two parts of the hose may be readily and rapidly connected, and correspondingly as easily disconnected when desired.

A is a socket connected with the extension B to which the end of the hose is attached. This socket A has sufficient interior diameter to admit the cylindrical part C which is correspondingly attached to the opposite part of the hose which is to be connected with A. At the bottom of the socket A inside is a washer D against which the end of the part C abuts and by which a water tight joint is made. This washer is of slightly larger diameter than the interior of the socket, and a channel is made around the bottom of the socket into which the washer is seated, and by which it is retained in place. Upon the part C are two oppositely projecting lugs E, and the opposite sides of the part A have grooves or channels F made extending straight in from the end of the socket piece, and of sufficient diameter to admit the lugs upon the piece C. The outside of the part A is screw-threaded, near the outer end as shown, and a collar G has corresponding screw-threads on the interior which fit the screw-threads upon the outside of A and allow it to turn thereon.

H is a stop formed with or attached to the outside of A, and I are lugs upon the inner side of the collar G which strike this stop when the collar has been turned as far as desired in either direction. This collar has inclined grooves or channels J made upon opposite sides to correspond with the straight slots made in the sides of A, and when these inclined channels have their outer ends in line with the outer ends of the slots in A, the end of C may be introduced into A, the lugs E which project from it entering the straight slots in A and the upper ends of the inclined slots in the collar G.

By pushing the part C into A until it is seated against the washer, the lugs follow the straight slots in A, and by their action against the sides of the inclined channels in the collar G, the latter is turned around until the lugs have arrived at a point on the inside of the projecting collar, the ends of the lugs projecting far enough through the sides of A so that when the collar has turned to that position, the lugs will be in straight line with the flat surfaces K on the inside of the collar, and will thus lock the collar so that the two parts cannot be separated by a straight pull, and can only be separated by again turning the collar backwardly to allow the lugs to follow the inclined grooves out. The lugs I are so placed that they form extensions beyond the inclined channels of the collar, and they continue the movement of the collar as the lugs E pass through and form contact with them, and thus turn the collar so far that the lugs E cannot be withdrawn through the inclined channels of the collar.

In order to insure the lugs entering the slots F and inclined channels of the collar properly, we have shown two projections L from the outer end face of the collar, these projections being of such a length that when the end of the part C is partly entered into the socket of A, if the collar does not happen to be in the right position, the lugs E upon C are brought in contact with the lugs L, and the part C being turned around will turn the collar until the lugs E are in position to drop into the channels in A and in the collar G, so as to engage the two parts as before described.

As soon as the lugs E are properly behind the collar G as previously described, the connection is made water tight by giving the collar a further turn, which advances it upon the screw-threads on the part A, and causes the lugs E to move up inclined surfaces N on the inside of the collar, thus forcing the end of the part C closely against the washer in the bottom of A, and making a water tight joint. This joint is equally well made, by making the part C of a sufficiently large interior diameter to admit an extension A' of the part A beyond the collar G. In this construction the washer is seated in the interior of the enlargement C, and the end of A' fits against it when the two parts are secured together, and makes a water tight joint. The extension A' may be screw-threaded on the outside to allow it to be used with any ordinary screw coupling upon a connecting section.

When the parts of the hose are pushed together, as previously described, there is no turning of either part of the hose coupling, they are simply pushed straight together, the lugs E on the part C entering the straight slots F in the end of A which guide them, while the inclined channels in the collar G are acted upon by the lugs E so as to turn the collar around far enough to lock the lugs beneath the collar so that it is only necessary to give the collar a slight turn to make the joint perfectly water tight.

The coupling is disengaged by turning the collar G far enough to allow the lugs E to enter the inclined grooves of the collar, so that when the parts of the coupling are pulled apart, the lugs will turn the collar backward as they are pulled out, and thus release it and allow the parts to be separated.

In Fig. 6 we have shown essentially the same construction with the exception that the part A is slightly enlarged and screw-threaded on the inside and the collar G is fitted on the screw-threads in the inside of A instead of on the outside as shown in Fig. 1.

The inclined slots in the collar and the straight slots in the part A perform the same office as that described when the collar is on the outside.

Having thus described our invention, what we claim as new, and desire to secure by Letters Patent, is—

1. A hose coupling consisting of a socket portion attached to one of the ends to be coupled, and having a washer at the bottom, a coupling end attached to the opposite part of the hose adapted to enter the socket piece and abut against the washer, lugs projecting from opposite sides of said end, straight slots in the socket portion into which said lugs are adapted to fit, a collar fitting the end of the socket portion having screw-threads by which it is advanced with relation to the socket portion when turned, inclined channels made in the interior of the collar into which slots the lugs upon the opposite coupling end enter when they are in line with the straight slots of the socket piece, said inclined channels being acted upon by the lugs to rotate the collar so that the lugs are locked beneath it when the coupling end is introduced into the socket, substantially as herein described.

2. A hose coupling consisting of the socket A attached to one end of the hose having screw-threads upon its outer end, a collar fitted to turn in said screw-threads, stops by which the rotation of said collar about the socket is limited, straight slots made in opposite sides of the socket piece and inclined grooves made in the collar corresponding with the slots in the socket piece, a coupling end C attached to the opposite portion of the hose having lugs E projecting from opposite sides which are adapted to enter the slots in the socket piece, and the inclined channels in the collar, and lugs L projecting from the end face of the collar, which are engaged by the lugs E upon the opposite coupling piece when the latter is introduced into the socket A, whereby the collar may be turned upon a socket piece and the lugs upon the coupling C are allowed to enter the slots and channels simultaneously, substantially as herein described.

3. A hose coupling consisting of a socket and an entering end fixed respectively to the meeting ends of the hose, and an intermediate washer to make a joint, a collar adapted to turn on screw-threads upon one section and having inclined channels made in it, and lugs upon the inner flat face forming continuations beyond the channels, lugs projecting from the sides of the opposing section adapted to enter the said channels when the two parts are brought together, whereby the collar is turned and a coupling and lock is effected, substantially as herein described.

In witness whereof we have hereunto set our hands.

NATHAN WALLACE WILLIAMS.
EDWARD BLAKE SEELY.

Witnesses to Williams:
 W. I. CUMMINGS,
 S. W. BOUTON.
Witnesses to Seely:
 W. BLAISDELL,
 A. L. FARR.